United States Patent Office 2,810,102
Patented Oct. 15, 1957

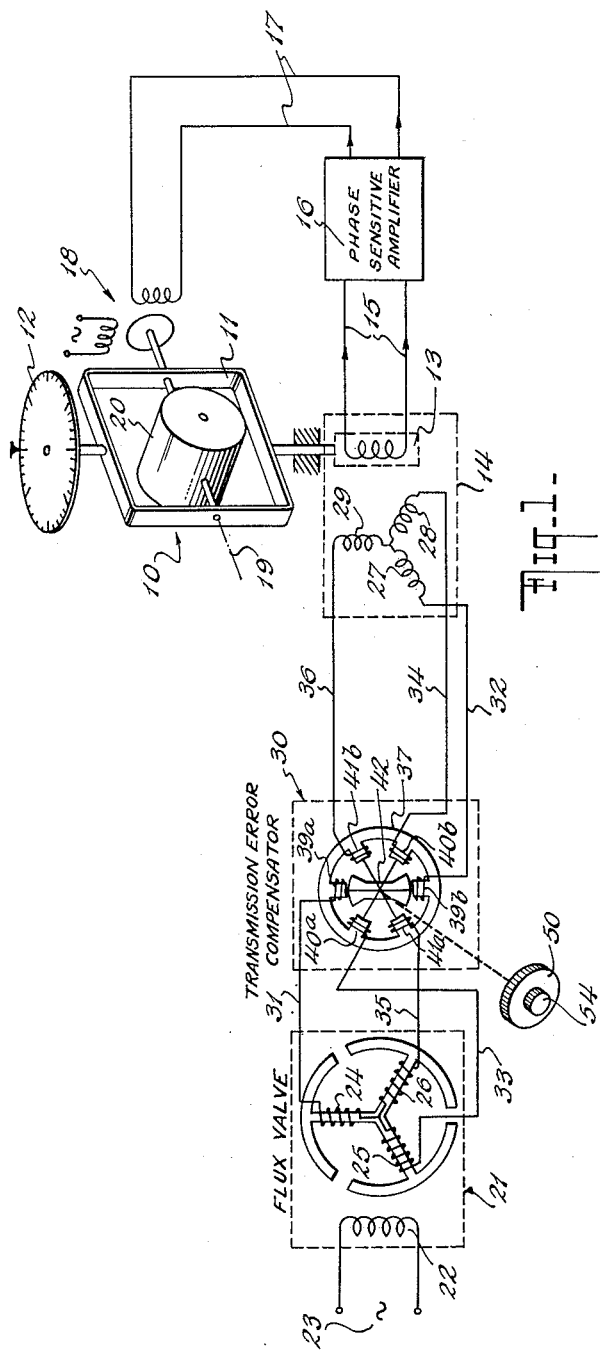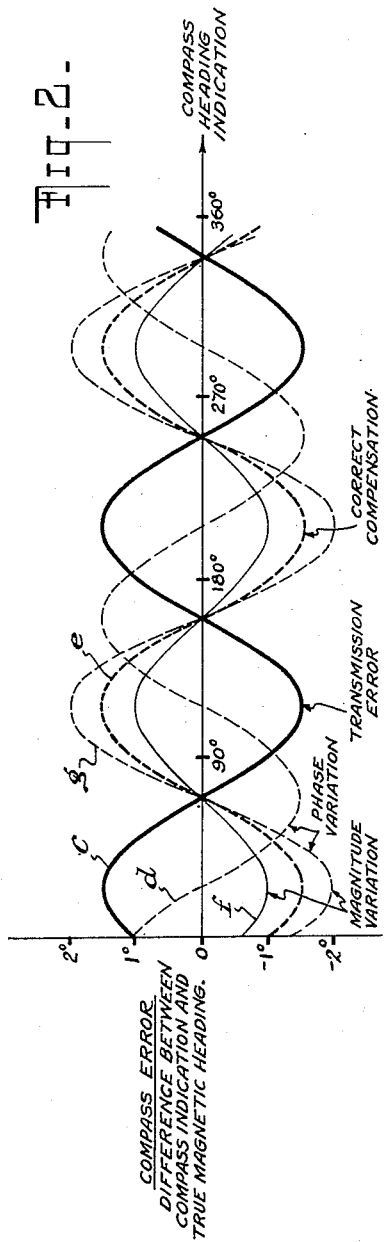
INVENTORS
MARLIN C. DEPP
CAESAR F. FRAGOLA
BY
Arthur H. Serrell
ATTORNEY

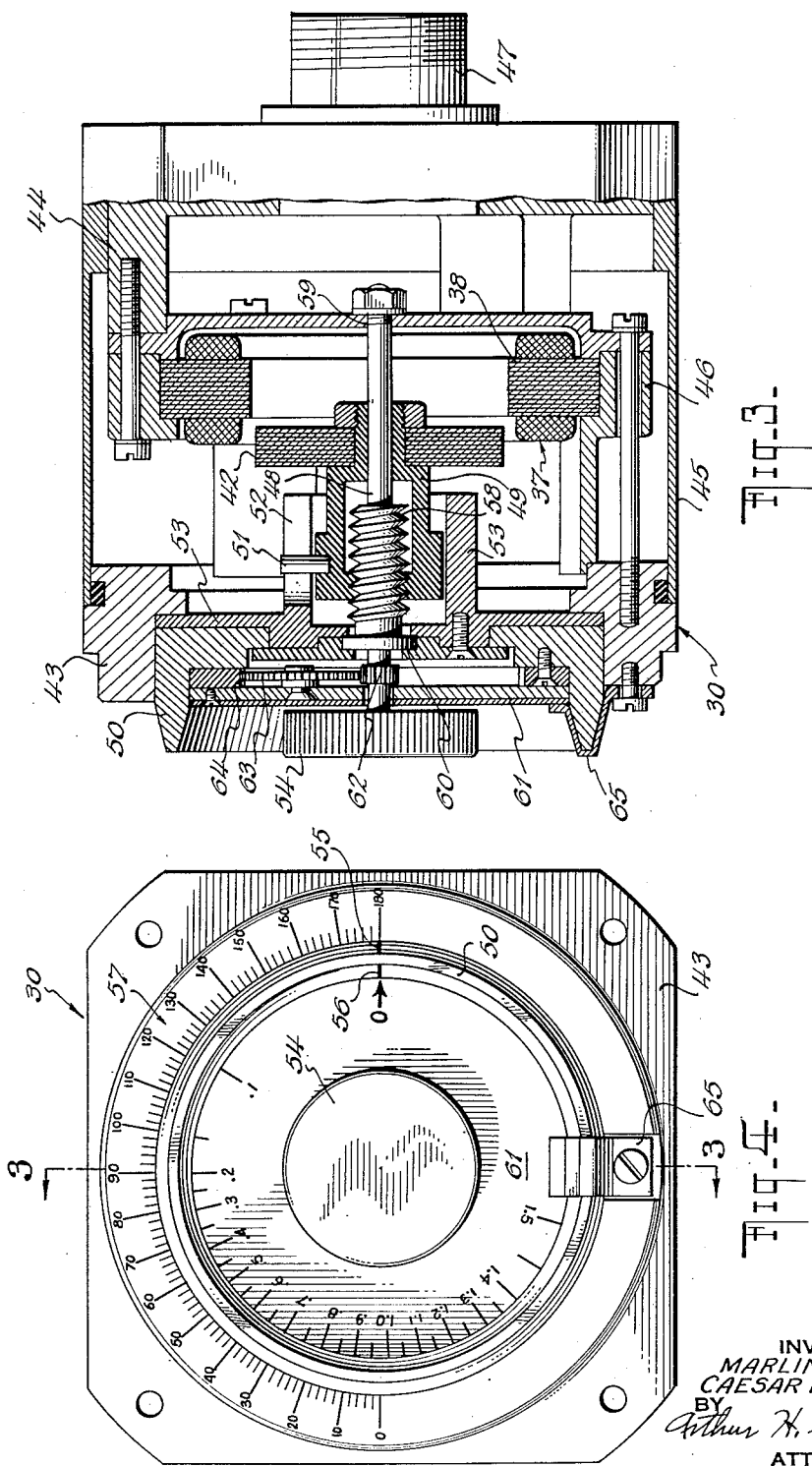

2,810,102

DEVICE FOR COMPENSATING A DATA TRANSMISSION SYSTEM FOR TWO CYCLE ERRORS

Marlin C. Depp and Caesar F. Fragola, Uniondale, N. Y., assignors to Sperry Rand Corporation, a corporation of Delaware Application April 1, 1955, Serial No. 498,596

13 Claims. (Cl. 318—30)

This invention relates to a device for compensating two cycle or second harmonic errors in an electrical data transmission system. The improved device is particularly useful in correcting three phase or n-phase alternating current systems which transmit angular position data such as provided by the output of a flux valve in the earth's magnetic field to a receiver instrument for controlling a remote compass card. Three phase systems of this character include selsyn data transmission systems with a transmitter having a rotor operatively connected to any angular motion data to be transmitted and a receiver located at a remote point having a rotor positioned in accordance with the transmitted data.

Two cycle errors arise in electrical data transmission systems due to irregularities in the impedances of the branches of the transmitter and receiver elements of the system. Also, a minor source of two cycle error in compass systems is the distortion of the earth's magnetic field due to non-permanently magnetizable magnetic parts on the craft using the system in the vicinity of the earth's field sensitive transmitter element or flux valve. That portion of the non-permanently magnetizable iron field that lies in a horizontal plane may produce a two cycle error. Two cycle error is characterized by having two complete maxima and minima for each 360 degrees of rotation of the data transmitting element of the system, i. e., the error goes through two complete cycles of variation for each cycle of rotation of the data element.

In accordance with the teaching of the prior art, second harmonic or two cycle errors were previously corrected in systems of the character described by the inclusion of a separate variable reactance device in each of the transmission lines of the system. Four of such devices are particularly indicated at 82 in Fig. 7 of the United States Patent No. 2,651,010, issued September 1, 1953, to H. C. Wendt. Individual adjustment of the separate reactances is required before compensation is achieved. The impedance adjustments necessary in the various transmission lines of the system are effected independently so that accurate settings and total compensation are difficult to obtain. A further two cycle error corrector is shown and described in United States Patent No. 2,700,745, issued January 25, 1955, to M. C. Depp and S. Kellogg, 2nd, which includes tapped inductances for two of the legs of a transmission system with a first switching means for the same for adjusting the magnitude of the error and a second switching means operable to selectively connect selected values of inductance in the respective legs of the system to change the direction of the error.

The primary object of the present invention is to provide a simplified two cycle error corrector for both n-phase and three phase electrical data transmission systems.

A further object of the invention is to obtain two cycle error compensation by correction of the impedances in the respective phases of the data transmission system by a single adjustment.

A still further object of the invention is to provide a corrector of the character described with a winding for each of the phases of the data transmission system with a single adjustment for regulating the inductances of the windings.

These and other objects, features and structural details of the invention will become apparent from the following description in connection with the accompanying drawings, in which, Fig. 1 is a diagrammatic view of an illustrative data transmission system of the flux valve repeater compass type in which the improved compensating device is incorporated;

Fig. 2 is a graphical representation of a two cycle transmission error curve in a system of the character shown in Fig. 1 with additional curves employed in explanation of the correction obtained by the improved device in the system;

Fig. 3 is a sectional view taken on lines 3—3, Fig. 4, showing the interior of the improved compensating device; and Fig. 4 is a front elevation of the device as depicted in Fig. 3.

In connection with Fig. 1, the representative data transmission system illustrated is of the type wherein the receiver or repeater of the system is provided by a directional gyro 10 with a vertical ring 11 to which a compass card 12 or other indicator is fixedly connected. Ring 11 is also connected to the rotor 13 of the three phase receiver 14 of the system. The output of the system taken from rotor element 13 is fed by way of leads 15, phase sensitive amplifier 16 and leads 17 to the control winding of torque motor 18 whose rotor is effective to exert a torque about the axis 19 of the rotor case 20 of the directional gyro to precess the ring in a direction that restores the parts to an equilibrium condition wherein the output from the electrical receiver 14 is nil. As depicted, the transmitter of the data transmission system is a flux valve 21 whose excitation winding as indicated at 22 is connected to a suitable source of alternating current electrical energy 23. The Y-connected output windings of the three legged valve depicted as indicated at 24, 25 and 26 are respectively connected to the similarly arranged stator windings 27, 28 and 29 of the receiver 14 by way of the improved transmission error compensator 30 through respective leads 31, 32; 33, 34; and 35, 36. The electrical receiver 14 of the system is a selsyn type instrument whose rotor is controlled to follow the output of the transmitter as the craft on which the system is used moves about its azimuth axis or in a broader sense as angular motion from any source is utilized to effectively change the output of the transmitter of the system. In the illustrative system shown in Fig. 1, the directional gyro could be dispensed with and the card or other indicator 12 could be directly driven by the rotor element 13. With this arrangement, the rotor 13 is directly excited from the alternating current source 23.

In accordance with the present invention, a winding is provided in each of the phases or multi-circuit connections between the transmitter and receiver elements of the transmission system to effect the two cycle error compensation by impedance correction and the correction is obtained by a single adjustment. As shown in Figs. 1 and 3, the improved compensator includes a stator 37 with a flux conducting core structure 38 with windings thereon that provide an electromagnetic field for each of the phases of the transmission system. In the three phase form of the invention illustrated, the core structure 38 is identical in character to the stator element of a selsyn device which provides six 60° equiangularly spaced poles. The windings of the compensator are connected across opposite pairs of the respective stator poles and, as shown in Fig. 1, consist of windings 39a and 39b in a series connection between leads 31 and 32 of the system, windings 40a and 40b in a series connection between leads 33 and 34 of the system, and windings 41a and 41b in a series connection between leads 35 and 36 of the system. The windings of the compensator are arranged on the stator 37 to provide a number of equiangular disposed electromagnetic fields corresponding to the phases of the system. In the three phase system shown, three groups of windings are utilized that provide three 120° equiangularly spaced electromagnetic fields. The impedance correcting winding included on each of the phases of the system are identical in character. The windings as described are wound on the single stator core structure 38 of the improved compensator.

In accordance with the present invention, adjustment of the relative magnitudes of the impedances in the multiple or three branches of the system is achieved in a single operation by rotating a soft iron rotor 42 in relation to the stator element 37 to a position in which the correction has been effected. This provides the proper phasing of the corrective impedances to match the phase of the transmission error. The magnitude of the overall correction, after the phase has been adjusted, is adjusted by moving the rotor 42 axially in relation to the stator element 37, thus changing the reluctances of the electromagnetic flux fields of the compensator and increasing or decreasing the inductances of the windings of the stator 37.

The graph comprising Fig. 2 shows a typical two cycle error as it occurs in a flux valve compass repeater system of the character illustrated in Fig. 1. The ordinate dimension in the graph represents positive or negative compass error in degrees or the difference between compass indication and the true magnetic heading of a craft using the system. The abscissa dimension represents the azimuth position of the craft in degrees as it appears on the compass heading indicator. Curve "c" indicates the two cycle error in the system. The maxima and minima points of the error curve each occur twice as the craft goes through a complete rotation in azimuth. Curve "d" may be considered an attempted compensation curve as provided in accordance with the present invention by the rotative adjustment of the rotor 42 in relation to the stator 37. It is apparent that the phasing of curve "d" is incorrect for compensation of the transmission error inasmuch as to compensate the error completely the compensation curve must be both opposite in phase and equal in magnitude to the error curve. Curve "e" on the graph shows the correct compensation curve. This curve is obtained by the initial rotative adjustment of the rotor 42 in relation to the stator 37 to effect the required correction of the impedances in the respective phases of the data transmission system. Curves "f" and "g" on the graph show magnitude variations of the curve "e," obtained by moving the compensating rotor 42 axially in relation to the stator 37 while maintaining its angular position fixed. By the second adjustment of the compensator, the proper magnitude of the correction curve is obtained so that the error is completely compensated for. The flux conducting rotor 42 of the compensator is adjustable rotatively and axially in relation to the stator 37 to effect the compensation by correction of the impedances in the respective phases of the data transmission system in the first adjustment and by regulation of the inductances of the windings of the stator in the second adjustment.

With reference to Figs. 3 and 4, the physical structure of the compensator 30 includes a frame or housing body consisting of screw-connected front and rear mounting pieces 43 and 44, respectively, a cylindrical cover 45, and a spacing member 46 between the front and rear pieces on which the wound stator 37 is fixedly retained. A cable connector 47 is located at the rear of the frame through which the necessary inlet and output leads are made to the windings of the stator as shown in Fig. 1. The stator 37 may be a conventional selsyn stator element on which the flux conducting laminated core contains six 60° equidistantly spaced poles. Accordingly, six windings are situated on the stator core for use in the particular three phase system shown in Fig. 1, the windings being connected across opposite pairs of the respective poles. The poles of the core structure are specifically shown in the representation of the stator core included in Fig. 1.

The rotor 42 of the compensator is a flux conducting piece that is formed of a plurality of butterfly-shaped, laminated, soft iron plates.

As shown in Fig. 3, means are provided in the form of a shaft 48 and slide sleeve 49 connection in the housing of the device to mount the rotor 42 for rotation and axial movement in relation to the stator 37. The phase adjustment member of the compensator is constituted by a settable knob 50 that rotates in a circular recess provided in the front mounting piece 43. Movement of knob 50 is transmitted to the rotor 42 by way of a pin and slot connection, the pin 51 in the structure shown being fixed in a radially extending position on the slide sleeve part 49 and the slot 52 in a flange piece 53 extending axially of the shaft 48. The flange piece 53 is fixedly connected in a suitable manner to the actuator knob 50 to turn with the same as manual adjustment of the knob is made. In the described arrangement, the pin 51 transmits the rotative motion of knob 50 and flange 53 to sleeve part 49 to rotate the rotor 42 together with the shaft 48 until the proper phase adjustment of the compensator has been completed. In the structure provided, the knob 50 is the outer of two concentrically arranged adjustable members or knobs, the inner knob being indicated at 54. The portion of the phase adjusting knob 50 extending exteriorly of the mounting member 43 contains a phase index line 55 and a magnitude index line 56. The phase dial 57 with marking designations from zero to one hundred and eighty degrees extends circularly around the outside face of the mounting piece 43. In the position of the parts shown in Fig. 4, index line 55 is opposite the one hundred and eighty degree dial marking. As previously explained in connection with Fig. 2, the phase adjustment member or knob 50 of the compensator is first moved from the indicated position to any setting within the range of the dial 57 that compensates in phase for the two cycle error. In practice, the knob 50 is then left at this point while the magnitude knob 54 is adjusted.

As shown in Fig. 3, knob 54 is located on one end of the shaft 48 of the shaft and sleeve connection. Axial adjusting member 54 for the rotor 42 is connected to the slide sleeve 49 by a gear connection that includes worm gear 58 on shaft 48 that meshes with an axially toothed portion of the sleeve 49. Rotative motion of the knob 54 thusly causes the sleeve 49 to slide axially in relation to shaft 48 to move the rotor 42 axially in relation to the stator 37 and regulate the inductances of the windings of the stator. In this adjustment, knob 50 remains stationary, the pin 51 sliding axially in the slot 52 in the flange member 53. The shaft 48 of the structure is rotatably mounted within the housing by a suitable bearing 59 at the end thereof opposite the knob 54, and by a bearing plate formed as a part of flange member 53 that receives a flanged portion 60 of the shaft. The magnitude dial plate 61 of the compensator contains markings between zero and one and a half is set in relation to index 56 by movement of knob 54 through gear 62 on shaft 48, idler gear 63 rotatably mounted to the rear of the dial 61 and the fixed internal gear 64 that is suitably connected to the internal portion of knob 50. Rotation of gear 63 about fixed gear 64 causes movement of the dial 61 through the shafting interconnection between gear 63 and dial 61. In the illustrated position of index 56 and magnitude dial 61, the rotor is completely withdrawn from the stator 37. In practice, the knob 54 is set otherwise than that indicated to enable the first adjustment to be made. After the phase adjustment is completed, the knob 54 is then adjusted to obtain the proper magnitude for the compensating signal. A clamp 65 on the front mounting piece 43 of the compensator is tightened to engage both the knob 50 and the plate 61 after the adjustment is completed. In the illustrated arrangement, means are provided for connecting one or the other elements of the shaft and slide sleeve connection to the respective adjustable members or knobs 50 and 54 of the compensator to effect the required rotative and axial movements of the rotor 42. The embodiment of the compensator illustrated in Figs. 3 and 4 is a preferred mechanical structure that accomplishes the desired conditioning of the stator and rotor parts.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device for compensating two cycle transmission errors in an n-phase alternating current electrical data transmission system with interconnected signal transmitter and receiver elements including a stator having windings that provide a corresponding number of equiangularly disposed electromagnetic fields, there being a winding in each of the phase interconnections between the transmitter and receiver elements of the system, and a flux conducting rotor adjustable rotatively and axially in relation to the stator to effect the compensation by correction of the impedances in the respective phase interconnections of the data transmission system in the first-named adjustment and by regulation of the inductances of the windings of the stator in the second-named adjustment.

2. A device for compensating two cycle transmission errors in an n-phase alternating current electrical data transmission system with interconnected signal transmitter and receiver elements including a stator having windings that provide a corresponding number of equiangularly disposed electromagnetic fields, there being a winding in each of the phase interconnections between the transmitter and receiver elements of the system, a flux conducting rotor, and means for mounting said rotor in the housing of said device to rotate in relation to the stator with adjustment of a first settable knob and to translate axially in relation to the stator with adjustment of a second settable knob, the first knob being adjusted to effect compensation by correction of the impedances in the respective phase interconnections of the data transmission system and the second knob being adjusted to regulate the inductances of the windings of the stator.

3. A device for compensating two cycle transmission errors in a three phase alternating current electrical data transmission system with interconnected signal transmitter and receiver elements including a stator having windings that provide three 120° equiangularly spaced electromagnetic fields, there being a winding in each of the phase interconnections between the transmitter and receiver elements of the system, and a flux conducting rotor adjustable rotatively and axially in relation to the stator to effect the compensation by correction of the impedances in the respective phase interconnections of the data transmission system in the first-named adjustment and by regulation of the inductances of the windings of the stator in the second-named adjustment.

4. A device for compensating two cycle transmission errors in a three phase alternating current electrical data transmission system with interconnected signal transmitter and receiver elements including a stator having an electromagnetic flux conducting core structure with six 60° equiangularly spaced poles, windings connected across opposite pairs of the respective stator poles in each of the phase interconnections between the transmitter and receiver elements of the system, and a flux conducting rotor adjustable rotatively and axially in relation to the poles of the stator to effect the compensation by correction of the impedances in the respective phase interconnections of the data transmission system in the first named adjustment and by regulation of the inductances of the windings of the stator poles in the second-named adjustment.

5. A device for compensating two cycle transmission errors in a three phase alternating current electrical data transmission system with interconnected signal transmitter and receiver elements including a stator having windings that provide three 120° equiangularly spaced electromagnetic fields, there being a winding in each of the phase interconnections between the transmitter and receiver elements of the system, a flux conducting rotor, and means for mounting said rotor in the housing of said device to rotate in relation to the stator, with adjustment of a first settable knob and to translate axially in relation to the stator with adjustment of a second settable knob, the first knob being adjusted to effect compensation by correction of the impedances in the respective phase interconnections of the data transmission system and the second knob being adjusted to regulate the inductances of the windings of the stator.

6. A device for compensating two cycle transmission errors in a three phase alternating current electrical data transmission system with interconnected signal transmitter and receiver elements including a stator having windings that provide three 120° equiangularly spaced electromagnetic fields, there being a winding in each of the phase interconnections between the transmitter and receiver elements of the system, a flux conducting rotor, a shaft and slide sleeve connection in the housing of said device mounting said rotor for rotation and axial movement in relation to the stator, a pair of concentric adjustable members rotatably mounted in the housing of the device, means connecting the outer of the adjustable members to one of the mounting connection elements to rotate the rotor to correct the impedances in the respective phase interconnections of the data transmission system, and means connecting the inner of the adjustable members to the other of the mounting connection elements to move the rotor axially in relation to the stator and regulate the inductances of the windings of the stator.

7. A device as claimed in claim 6, in which the rotor rotating member is connected to said slide sleeve element through a pin and slot connection, and said member for moving said rotor axially is connected to the slide sleeve element by a gear connection on the shaft.

8. A device for compensating two cycle transmission errors in a three phase alternating current electrical data transmission system with interconnected signal transmitter and receiver elements including a stator having an electromagnetic flux conducting core with six 60° equiangularly spaced poles, windings connected across opposite pairs of the respective poles in each of the phase interconnections between the transmitter and receiver elements of the system, a flux conducting rotor, and means for mounting said rotor in the housing of said device to rotate in relation to the stator with adjustment of a first settable knob and to translate axially in relation to the stator with adjustment of a second settable knob, the first knob being adjusted to effect compensation by correction of the impedances in the respective phase interconnections of the data transmission system and the second knob being adjusted to regulate the inductances of the windings of the stator.

9. A device for compensating two cycle transmission errors in a three phase alternating current electrical data transmission system with interconnected signal transmitter and receiver elements including a stator having an electromagnetic flux conducting core with six 60° equiangularly spaced poles, windings connected across opposite pairs of the respective poles in each of the phase interconnections between the transmitter and receiver elements of the system, a flux conducting rotor, a shaft and slide sleeve connection in the housing of said device mounting said rotor for rotation and axial movement in relation to the stator, a pair of concentric adjustable members rotatably mounted in the housing of the device, means connecting the outer of the adjustable members to one of the mounting connection elements to rotate the rotor to correct the impedance in the respective phase interconnections of the data transmission system, and means connecting the inner of the adjustable members to the other of the mounting connection elements to move the rotor axially in relation to the stator and regulate the inductances of the windings of the stator.

10. A device as claimed in claim 9, in which the rotor rotating member is connected to said slide sleeve element through a pin and slot connection, and said member for moving said rotor axially is connected to the slide sleeve element by a gear connection on the shaft.

11. A device as claimed in claim 9, in which the rotor is formed of a plurality of butterfly shaped, soft iron, laminations.

12. A device for compensating two cycle transmission errors in a three phase alternating current flux valve-compass repeater system including a stator having windings that provide three 120° equiangularly spaced electromagnetic fields, there being a winding in each of the three phase interconnections of the system between the flux valve and compass repeater, and a flux conducting rotor adjustable rotatively and axially in relation to the stator to effect the compensation by correction of the impedances in the respective three phase interconnections of the system in the first-named adjustment and by regulation of the inductances of the windings of the stator in the second-named adjustment.

13. The combination in a data transmission system having a transmitter, a receiver, and a connecting circuit connected in multi-circuit fashion between the transmitter and receiver; of a device for compensating for two cycle transmission errors in the system including a stator with a winding in each of the multi-circuit connections of the system, and a flux conducting rotor adjustable rotatively and axially in relation to the stator to compensate for the error by correction of the impedances in the respective multi-circuit connections of the system in the first-named adjustment and by regulation of the inductances of the windings of the stator in the second-named adjustment.

References Cited in the file of this patent

UNITED STATES PATENTS

| | | |
|---|---|---|
| 2,178,306 | Lauck | Oct. 31, 1939 |
| 2,460,798 | McCarthy | Feb. 8, 1949 |
| 2,593,902 | Lee | Apr. 22, 1952 |